United States Patent [19]

Williams et al.

[11] 4,158,269

[45] Jun. 19, 1979

[54] NUTRIENT DISPERSAL DEVICE

[76] Inventors: John G. Williams; Vera Williams, both of 104 Main Ave., Ocean Grove, N.J. 07756

[21] Appl. No.: 824,646

[22] Filed: Aug. 15, 1977

[51] Int. Cl.² .............................................. A01G 29/00
[52] U.S. Cl. ........................................ 47/48.5; 111/7.1
[58] Field of Search ..................... 47/48.5; 111/7.1, 7.2

[56] References Cited

U.S. PATENT DOCUMENTS

| 73,442 | 1/1868 | Fish | 47/48.5 |
|---|---|---|---|
| 2,145,934 | 2/1939 | Kingman | 47/48.5 X |
| 2,380,721 | 7/1945 | Brigden | 47/48.5 |
| 3,101,570 | 8/1963 | Lienard | 47/48.5 |
| 3,821,863 | 7/1974 | Chan | 47/48.5 |

FOREIGN PATENT DOCUMENTS

| 191693 | 12/1906 | Fed. Rep. of Germany | 47/48.5 |
|---|---|---|---|
| 1212409 | 3/1960 | France | 47/48.5 |
| 437898 | 12/1967 | Switzerland | 111/7.1 |
| 620363 | 3/1949 | United Kingdom | 47/48.5 |
| 709708 | 6/1954 | United Kingdom | 111/7.1 |
| 900166 | 7/1962 | United Kingdom | 47/48.5 |
| 207806 | 2/1968 | U.S.S.R. | 47/48.5 |

Primary Examiner—Edgar S. Burr
Assistant Examiner—Steven A. Bratlie
Attorney, Agent, or Firm—Keith D. Nowak

[57] ABSTRACT

A nutrient dispersal device adapted for vertical insertion into the soil is comprised of a cap section, a hollow elongated cylindrical body section rotatably connected to the cap section at an upper end of the body section and a hollow tip section rotatably connected to the lower end of the body section. Liquids entering through a cap section aperture, mix with nutrients stored within the tip section and the resultant mix is dispersed through nutrient dispersal apertures arranged in the sidewalls of the body section. The diameter of the body section is advantageously less than the diameter of the tip section such that the nutrient dispersal apertures arranged in the sidewalls of the body section are not blocked by the surrounding soil during vertical insertion of the nutrient dispersal device into the soil. A flotation device contained with the body section of the nutrient dispersal device rises in conjunction with the liquid level in the body section to seal the cap aperture under conditions of rapid liquid input, thereby, preventing nutrient waste.

5 Claims, 3 Drawing Figures

FIG. 1
FIG. 2
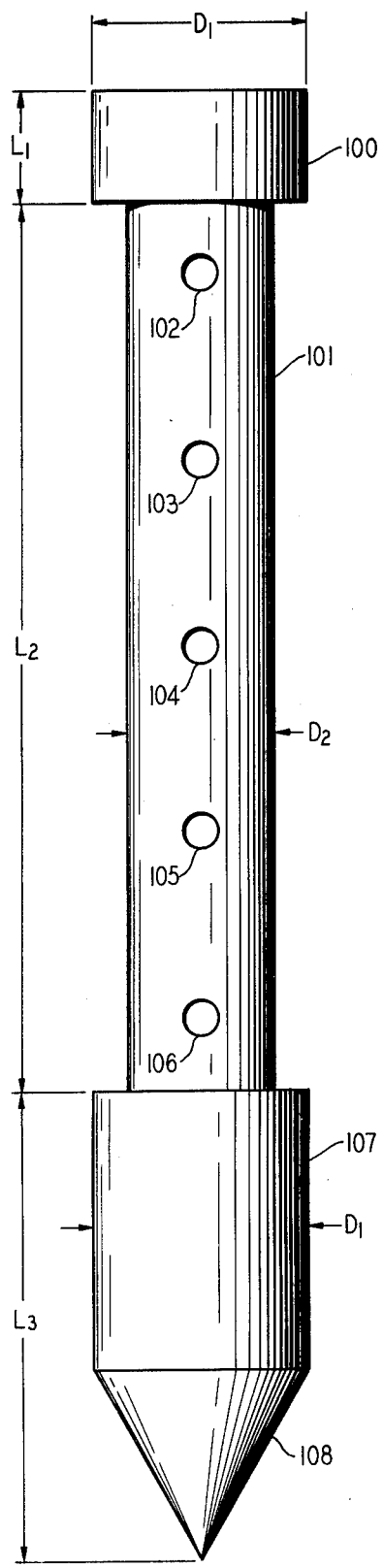
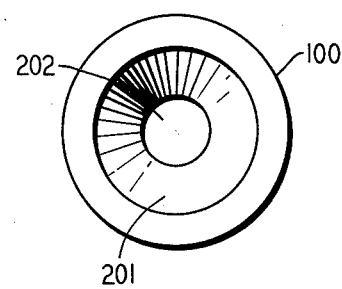

NUTRIENT DISPERSAL DEVICE

FIELD OF THE INVENTION

This invention relates to nutrient dispersion devices and more particularly to a nutrient dispersion device adapted to prevent blockage of the dispersion apertures upon insertion into the soil and also adapted to prevent nutrient waste when the device is inadvertently flooded.

DESCRIPTION OF THE PRIOR ART

Nutrient dispersion devices are well-known in the art. Typically, they consist of a hollow tube containing nutrients which is inserted vertically into the soil near a tree, shrub or other plant. Moisture enters the device at the upper end and is allowed to mix with the plant nutrients. The mixture of moisture and nutrients is then dispersed into the soil through apertures in sides or lower end of the device.

One such device is shown in U.S. Pat. No. 349,874 granted to J. Buhrer on Sept. 28, 1886. This device consists of a pipe open at both ends with perforated sides. The pipe is inserted vertically into the soil with the upper end being set even with the surface of the surrounding soil. A mixture of nutrients and liquid is placed into the pipe and allowed to disperse into the surrounding soil through the lower end and side apertures of the device. A cover is also provided to seal the upper end of the device should it be desired to exclude foreign matter such as dirt and leaves.

Another such device is shown in U.S. Pat. No. 3,900,962 granted to See Fong Chan on Aug. 26, 1975. This device although much more complicated than the one described in the Buhrer patent operates on the same basic principle. The device consists of an apertured pipe adapted to be vertically inserted into the soil. Nutrients are placed within the pipe and allowed to mix with moisture entering from the upper end of the device via a rotatably mounted rain water collector. The mixture of water and nutrients is dispersed into the surrounding soil via side apertures in the pipe. The amount of water allowed to mix with the nutrients is controlled by varying the size of the openings through which the water enters the device.

Both of the aforementioned devices contain either bottom or side apertures to allow dispersion of the nutrients into the surrounding soil. Both devices are also designed to be vertically inserted into the soil. Such vertical insertion is accomplished by digging a hole in the earth and burying the device or preferably is accomplished by forcing the device into the soil by the application of a vertical force on the upper end of the device. Forcing such a device into the soil invariably results in blocking the side and bottom apertures with soil as the device is inserted. Even when burying the device, the side and bottom apertures will be blocked as the soil is packed around the device to hold it firmly in the earth. Blockage of the dispersal apertures renders the device useless in the performance of its nutrient dispersal function. Clearing such a blockage can only be accomplished by forcing liquids through the device under great pressure which may waste the nutrients contained in the device by dispersing a large and unnecessary amount of nutrients into the surrounding soil. In addition, the excessive water pressure can result in damage to the surrounding root systems of the very plants which are being fertilized. The occurrence of such blockages is obviously a great disadvantage for nutrient dispersal devices.

It is, therefore, an object of this invention to prevent aperture blockage when vertically inserting a nutrient dispersal device into the soil.

It is another object of this invention to provide an inexpensive and easily manufactured nutrient dispersal device which can be inserted vertically into the soil without blocking the dispersal apertures of the devices.

Another disadvantage inherent in the prior art devices is the inability to readily prevent flooding the device when unexpected amounts of rainfall occur. Large amounts of rainfall allow an excessive amount of liquid to enter the devices which will wash the nutrients out the top of the device and onto the soil surface or alternatively force excessive amounts of nutrients into the surrounding soil, resulting in damage to the nearby root systems. The Buhrer patent attempts to solve this problem by providing a cap for the device and the Chan patent attempts to solve this problem by varying the size of the apertures through which rainfall enters. Both of these solutions are only effective when excessive rainfall can be predicted well in advance so that preventive action may be taken. Unfortunately, such predictions are extremely difficult even with the latest scientific methods of weather forecasting.

It is, therefore, another object of this invention to automatically prevent the flooding of a nutrient dispersal device upon the occurrence of excessive rainfall.

It is a further object of this invention to provide a simple and inexpensive nutrient dispersal device advantageously adapted to prevent nutrient waste in the presence of excessive amounts of moisture entering the device.

It is a general object of this invention to provide an inexpensive and effective nutrient dispersal device which is easily manufactured and yet eliminates the disadvantages inherent in prior art nutrient dispersal devices.

SUMMARY OF THE INVENTION

In accordance with the invention, a nutrient dispersal device, adapted for vertical insertion into the soil, is comprised of a cap section, a hollow elongated cylindrical body section rotatably connected to the cap section at an upper end of the body section and a hollow tip section rotatably connected to a lower end of the body section. The cap section includes an aperture having conical sidewalls for directing liquids into the hollow cylindrical body section of the nutrient dispersal device, the body section contains a plurality of nutrient dispersal apertures and the hollow tip section includes a reservoir for the storage of plant nutrients.

It is a feature of the invention that the diameter of the cylindrical body section is less than the diameter of the tip section whereby the nutrient dispersal device can be vertically inserted into the soil without blocking the nutrient dispersal apertures contained within the body section.

It is another feature of the invention that liquids entering via the cap aperture mix with the nutrients contained within the tip reservoir and the resultant mixture is dispersed into the surrounding soil via the nutrient dispersal apertures contained within the hollow cylindrical body section.

In accordance with another aspect of the invention, a flotation device is contained within the hollow cylindrical body section and said flotation device advantageously rises within said hollow body section in conjunction with the level of liquid within the body section.

It is another feature of the invention that under conditions of rapid liquid input via the cap aperture said flotation device will rise in conjunction with the liquid level to the level of said cap aperture.

It is a further feature of the invention that said flotation device advantageously seals said cap aperture at the time the liquid level within the body section rises to the level of the cap aperture, thereby, preventing further liquid input via the cap aperture and preventing nutrients contained within the device from being washed out through the cap aperture.

It is another feature of the invention that said flotation device will fall within said hollow body section as the liquid contained therein is dispersed into the surrounding soil via the nutrient dispersal apertures.

It is another feature of the invention that said cap aperture is unsealed as the flotation device falls in conjunction with the liquid level to thereby allow additional liquid input via the cap aperture.

These and other objects and features of the invention will be more fully appreciated from the following detailed description when taken in conjunction with the accompanying drawings, in which:

BRIEF DESCRIPTION OF THE DRAWINGS

FIG. 1 is a perspective view of a nutrient dispersal device in accordance with the instant invention, FIG. 2 is a top view of the cap section of the nutrient dispersal device illustrating the cap aperture.

DETAILED DESCRIPTION

Figure 3:
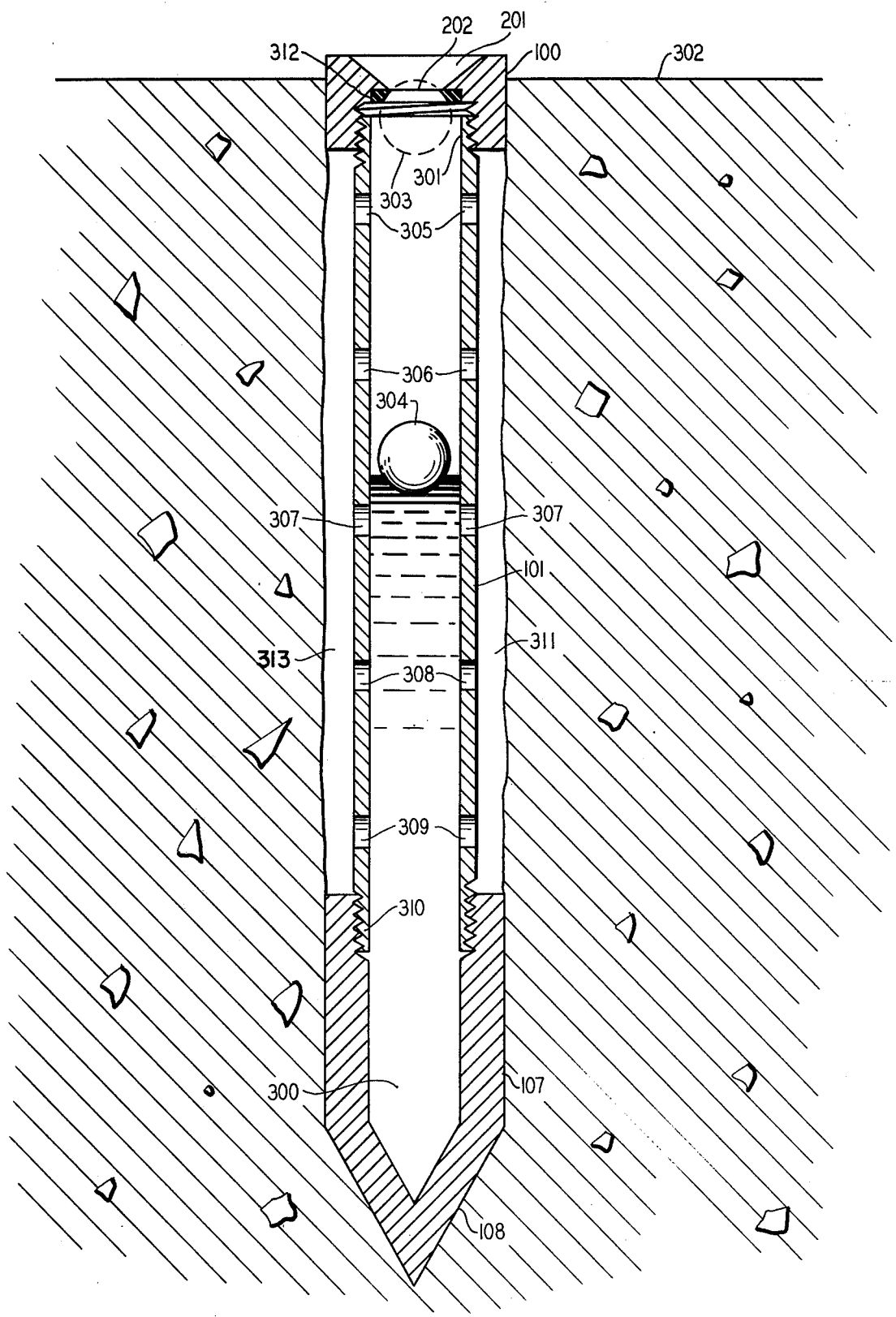
FIG. 3 is a cross-sectional view of the nutrient dispersal device.

Refer to FIG. 1. Therein is shown a nutrient dispersal device advantageously designed to be vertically inserted into the soil near a plant, tree, or shrub. Nutrients are placed within the device and allowed to disperse into the surrounding soil to fertilize and nourish nearby plants, trees and shrubs. More particularly, the nutrient dispersal device depicted in FIG. 1 consists of cap section 100, an elongated hollow cylindrical body 101 and a hollow tip section 107. The cap section 100 is rotatably connected to body 101 which is in turn rotatably connected to tip 107.

Cap section 100 is of a diameter $D_1$ and of a length $L_1$. The cap section is more fully shown in FIG. 2 wherein it is seen that the cap 100 contains a conical aperture consisting of tapered upstanding conical walls 201 and a recessed entry port 202. As will be more fully described hereinafter, the conical aperture contained in cap 100 advantageously directs rainfall or manually applied liquids through the cap and into cylindrical body section 101.

Hollow cylindrical body 101 is of a length $L_2$ and of a diameter $D_2$ wherein $D_2$ is advantageously designed to be less than diameter $D_1$. Inserted within the sidewalls of body section 101 are a plurality of nutrient dispersal apertures 102 through 106. These apertures allow plant nutrients and moisture to be released into the surrounding soil to thereby provide nutrition and water for surrounding shrubs, trees and plants in a manner to be subsequently described.

Contained within body section 101 is a flotation device whose operation and advantage will be more fully described hereinafter in conjunction with FIG. 3.

Tip section 107 is a hollow cylindrical storage area for plant nutrients which is terminated by tapered point 108 to provide convenient and easy vertical insertion into the soil. Tip section 107 is of a diameter $D_1$ equal to the diameter of cap section 100 and of a length $L_3$.

The total length of the nutrient dispersal device shown in FIG. 1 is the summation of lengths $L_1$, $L_2$, and $L_3$. This total length can be adjusted according to the depth at which it is desired to disperse nutrients into the soil. Illustrative lengths for the cap, body and tip sections can be for example, $L_1$ equal to 0.75 inches, $L_2$ equal to 6.0 inches and $L_3$ equal to 3.5 inches. These lengths are merely illustrative of one embodiment of the invention and can be varied according to the needs of the user and varied according to the type of plant, tree or shrub it is desired to fertilize.

The diameter $D_1$ of cap section 100 is equal to the diameter of tip section 107. The diameter $D_2$ of body section 101, however, is advantageously less than the diameter of the cap section and the tip section. Selection of body diameter $D_2$ to be less than diameter $D_1$ allows the nutrient dispersal device to be vertically inserted into the soil without blocking nutrient dispersal apertures 102 through 106. The manner in which this is accomplished will be more fully described hereinafter in conjunction with FIG. 3. Illustrative diameters for the various sections would be $D_1$ equal to 1.5 inches and $D_2$ equal to 1.0 inch. Again, these dimensions are merely illustrative of one embodiment of the invention and can be varied according to the individual requirements of the user and varied according to the particular plant, tree or shrub being fertilized.

The nutrient dispersal device shown in FIG. 1 can be manufactured of brass, white metal or any other material that does not rust or corrode.

Particularly advantageous in terms of manufacturing cost would be to construct the nutrient dispersal device of a plastic material of sufficient strength and durability such that the device would be able to withstand the stress of repeated insertions into and removals from the soil. Various plastic materials exhibiting these desired characteristics of strength and durability are well-known in the art and, therefore, will not be listed here.

Refer now to FIG. 3. Therein is shown a cross-sectional view of the nutrient dispersal device of FIG. 1 inserted into the soil to perform its nutrient dispersal function. As has been described above, the nutrient dispersal device is comprised of three sections, a cap section 100, rotatably connected to a hollow body section 101 which is in turn rotatably connected to a tip section 107. FIG. 3 illustrates at 301 and at 310 that the rotatable connections between the various sections are comprised of a first threaded connection at 301 between the cap section and the upper end of the body section and a second threaded connection at 310 between the lower end of the body section and the tip section.

Before insertion into the soil, the tip section 107 is disconnected from the body section by rotating the tip section with respect to the body section in such a manner so as to disengage the threaded connection at 310. Subsequent thereto a measured amount of liquid soluble plant nutrients are placed within the nutrient reservoir 300 of the hollow tip section. The tip section is then reconnected to the body section and the entire device is inserted into the soil near a plant, tree, or shrub that requires fertilization. Alternatively, of course, plant nutrients can be placed within the device through the entry port 202 in the cap aperture either before or after the device is inserted into the soil, thereby eliminating the necessity of disconnecting the tip section from the body section. Insertion into the soil can be accomplished by burying the device or alternatively a more advantageous method of insertion is accomplished by applying a vertical force to the top of the device to thereby force the entire device into the soil. The preferred depth of insertion is as indicated in FIG. 3 wherein the cap of the device is approximately level with the soil surface at 302 and the nutrient dispersal apertures of the body section the interior of which are, indicated at 305 through 309, are well below the soil surface. Vertical insertion is more easily accomplished due to the pointed end 108 of the tip section which facilitates insertion in a well-known manner.

An important aspect and advantage of the invention is illustrated in FIG. 3 at 313 and 311. More particularly elongate spaces 313 and 311 indicate in corss-section the fact that subsequent to insertion into the soil elongated spaces are advantageously provided between the body section 101 of the device and the surrounding soil. This space is automatically provided during insertion due to the fact that the diameter of the body section is less than the diameter of the tip section. As illustrated in FIG. 3, the larger diameter of the tip section causes the surrounding soil, during insertion, to be forced apart a sufficient amount to provide for entry of the tip section. However, as the diameter of the body section is less than the diameter of the tip section, elongate spaces are created around the body section and these elongate spaces are of a width on each side of the body section equal to one-half the difference between the diameter of the tip section and the diameter of the body section.

The presence of elongate spaces 313 and 311 advantageously prevent the blockage of nutrient dispersal apertures 305 through 309 by the surrounding soil during insertion. Such blockage of the dispersal apertures is an inherent disadvantage of prior art nutrient dispersal devices. This disadvantage is completely eliminated by the unique advantage of the instant invention in providing a tip section of a first diameter and a body section of a second diameter wherein said second diameter is less than said first diameter.

Subsequent to insertion into the soil, liquid is directed into the body section of the device via the tapered conical upstanding sidewalls 201 and the recessed entry port 202 of the cap aperture. Such liquids can result naturally from periodic rainfall or alternatively can result from manually applied liquid from a garden hose or from other well-know liquid dispersal devices. The liquid enters the body section of the device and falls there through into nutrient reservoir 300 which has been previously filled with a liquid soluble plant nutrient in a manner previously described. The liquid mixes with the plant nutrients and as additional liquid enters via the cap aperture, the level of the resultant mix of liquid and nutrient rises within tip section 107 and body section 101 to the level of the nutrient dispersal apertures the interior of which is indicated at 305 through 309. When the liquid level reaches the level of one or more of the dispersal apertures the mix of liquid and nutrient is dispersed into the surrounding soil to provide nutrition and moisture for surrounding trees, plants or shrubs.

Each time liquid is directed into the body and tip section of the device, this dispersal action occurs. Advantageously, however, not all of the plant nutrients are dispersed upon a first dispersal action, but rather the nutrient reservoir 300 will retain a certain smaller amount of nutrients which are available for subsequent dispersal actions. The amount of nutrients available for subsequent dispersal actions will of course decrease with each entry of liquid into the device. However, nutrient reservoir 300 can be arranged of sufficient volume to allow one filling of the reservoir to result in continuous fertilizatiion of the surrounding plants over a period of several weeks before the reservoir must be refilled with additional plant nutrients.

Contained within hollow body section 101 is a flotation device 304 of a diameter less than the inside diameter of body section 101. This flotation device will rise and fall in conjunction with the liquid level within the body section in a well-known manner. Under normal conditions of liquid input, the flotation device will simply rise and fall with the liquid level and have no effect on the dispersal action of the nutrients contained within the nutrient dispersal device. However, under conditions of rapid liquid input, such as would occur in a heavy rainstrom, the nutrient dispersal apertures would perhaps be unable to disperse the liquid at a rate equal to the rate of liquid input. Under these conditions the liquid level and the flotation device would continue to rise until the liquid level and the flotation device reached the level of the cap aperture.

Indicated in FIG. 3, at 303 is the position of the flotation device within the body section when the liquid level has risen to the level of the cap aperture. As indicated therein, the diameter of the flotation device is advantageously arranged such that when the flotation device rises to this level, it effectively seals the cap aperture and thereby prevents further entry of liquids into the body section via the cap aperture. This sealing effect can be enhanced by a gasket of rubber or other suitable material indicated at 312 which will increase the ability of the flotation device to seal the cap aperture.

The ability of the flotation device to rise with the liquid level within the body section and to seal the cap aperture when the liquid level reaches the level of the cap aperture provides another important aspect and advantage of the invention. More particularly, under conditions of rapid fluid input, such as would occur during a heavy rainstorm, the flotation device will rise with the level of liquid and seal the cap aperture when the nutrient device is filled with liquid. This prevents further liquid entry and thus prevents the nutrients contained within the nutrient reservoir from being washed out through the cap aperture which would occur under conditions of rapid input of liquids via the cap aperture. Therefore, this aspect of the invention advantageously prevents nutrient waste under conditions of rapid liquid input by providing the flotation device which rises in conjunction with the liquid level in the body section and seals the cap aperture when the body and tip section are filled with liquid.

When the rate of liquid input decreases, the level of liquid within the body section will fall as the liquid is dispersed via the nutrient dispersal apertures. The flotation device will, of course, fall with the liquid level, thereby unsealing the cap aperture to allow for subsequent liquid entry and repetition of the dispersal action described above.

The foregoing disclosure and description of the invention is illustrative and explanatory thereof and various changes in the size, shape and materials as well as in the details of the illustrated construction may be made within the scope of the appended claims without departing from the spirit of the invention.

What is claimed is:

1. A nutrient dispersal device comprising a hollow body section having an upper and lower end and having apertures in sidewalls of the body section, a cap section rotatably connected to the upper end of said body section, said cap section containing at least one aperture of a predetermined diameter to allow liquids entrance into said body section, and a hollow tip section rotatably connected to the lower end of said body section, characterized in that said nutrient dispersal device further comprises a single storage chamber formed from said hollow body section and said hollow tip section, said storage chamber extending from said cap section to a lower end of said hollow tip section, said storage chamber being of uniform diameter from said cap section to the lower end of said hollow tip section, flotation means contained within said single storage chamber for rising in conjunction with the liquid level within said single storage chamber and for sealing said cap aperture at the time the liquid level within said single storage chamber rises to the level of the cap aperture, said flotation means consisting only of a single spherical float being of a diameter less than said uniform diameter and greater than predetermined diameter and arranged to rise in conjunction with said liquid level from the lower end of said tip section to said cap aperture, said tip section being of a first diameter and said body section being of a second diameter, said second diameter being less than said first diameter, whereby said apertures in the sidewalls of the body section are not blocked upon vertical insertion of said nutrient dispersal device into the soil.

2. A nutrient dispersal device in accordance with claim 1 wherein said hollow tip section rotatably connected to the lower end of said hollow body section is a container for liquid soluble nutrients.

3. A nutrient dispersal device in accordance with claim 2, wherein the apertures included within the sidewalls of the hollow body section disperse the liquid soluble nutrients through the apertures into the surrounding soil as the liquid level rises within the hollow tube.

4. A nutrient dispersal device in accordance with claim 1, wherein sidewalls of the aperture contained within said cap section are conical in shape.

5. A nutrient dispersal device in accordance with claim 1, wherein said flotation means includes means responsive to a decrease in the liquid level in said body section for unsealing said cap aperture.

* * * * *